United States Patent [19]

Greek, Jr. et al.

[11] 3,911,407

[45] Oct. 7, 1975

[54] TEXT PROCESSING SYSTEM

[75] Inventors: John Charlie Greek, Jr., Austin; Michael Eudell McBride, Leander; Howard Carl Tanner, Austin, all of Tex.

[73] Assignee: International Business Machines Corporation, Armonk, N.Y.

[22] Filed: Dec. 26, 1973

[21] Appl. No.: 427,756

[52] U.S. Cl. .......... 340/172.5

[51] Int. Cl.[2] .......... G06F 3/14

[58] Field of Search .......... 340/172.5

[56] References Cited

UNITED STATES PATENTS

| | | | |
|---|---|---|---|
| 2,905,930 | 9/1959 | Golden | 340/172.5 |
| 3,059,221 | 10/1962 | Page et al. | 340/172.5 |
| 3,564,505 | 2/1971 | Finnila et al. | 340/172.5 |
| 3,688,275 | 8/1972 | Fredrickson et al. | 340/172.5 |
| 3,757,311 | 9/1973 | Byram et al. | 340/172.5 |

*Primary Examiner*—Gareth D. Shaw
*Assistant Examiner*—Michael C. Sachs
*Attorney, Agent, or Firm*—James H. Barksdale, Jr.

[57] ABSTRACT

A text processing system having a high data rate cyclic memory interfaced with a low data rate text processor through a random access memory for processing text stored in the cyclic memory. Text character codes and control codes are initially stored in the cyclic memory. Depending on the system operation to be performed, selected character and control codes are transferred from the cyclic memory to the random access memory until the capacity thereof is reached. Thereafter, the character and control codes stored in the random access memory are gated out to the text processor for processing.

12 Claims, 14 Drawing Figures

TEXT PROCESSING SYSTEM

BACKGROUND OF THE INVENTION

1. Field of the Invention

This invention relates generally to text processing, and more specifically to interfacing a low data rate processor with a high data rate cyclic memory through a random access memory in such a manner that the data rate of the cyclic memory is not affected and the efficiency of the processor is improved.

2. Description of the Prior Art

Heretofore, there have been quite a number of text processing systems available in the prior art. One example is the IBM Magnetic Tape "Selectric"* Composer (MT/SC). With this system, character and control codes are stored on a tape through the use of an IBM Magnetic Tape "Selectric"* Typewriter. This prepared tape in conjunction with a tape program is used with the MT/SC for processing text in terms of, for example, justification. Interfacing problems in terms of data rates are not acute with the MT/SC since the tape data rate is matched to the text processor data rate. That is, the tape is advanced for the reading of data codes when the processor is ready. At present, there are no known efficient systems having different component data rates. When a high data rate cyclic memory, such as an electronic dynamic shift register, is used as a primary storage device, other operations can be performed while text is being processed by the text processor if the data is temporarily stored in a random access memory. Also, the data will be ready for transferring to the text processor without having to wait for desired data codes in a large block of data codes. Further, through the transfer of selected data and control codes to the processor, system efficiency is improved.

* Registered Trademark — International Business Machines Corporation

SUMMARY OF THE INVENTION

A text processing system is provided having a text processor, a random access memory, and an electronic dynamic shift register interconnected such that efficiency of text processing is improved. With the rapidly recirculating shift register memory used in this system, the operating point or operation flag is often rapidly moved or repositioned in memory. When so repositioned, the new operating point may be located in a section of text where a different system state is in effect. It will then be necessary to determine the mode, measure, etc. in effect for the text in question. Since the text processor does not have direct control of the operation flag, the random access memory is interfaced between the shift register and the text processor. When ready, the processor will cause the loading of selected characters and codes into the random access memory from the shift register for processing at the text processor rate. Only necessary and required data is shifted out of the shift register and transferred to the random access memory for later processing by the processor. That is, depending on the operation to be performed, selected character and control codes are transferred to the random access memory. When the dynamic shift register memory to random access memory transfer operation is complete, the character codes stored in the random access memory are gated out to the text processor for processing. This provides for an efficient use of the processor and at the same time eliminates the necessity for any attempt to match the processor data rate to the shift register data rate.

DESCRIPTION OF THE PREFERRED EMBODIMENT

Figure 1A:
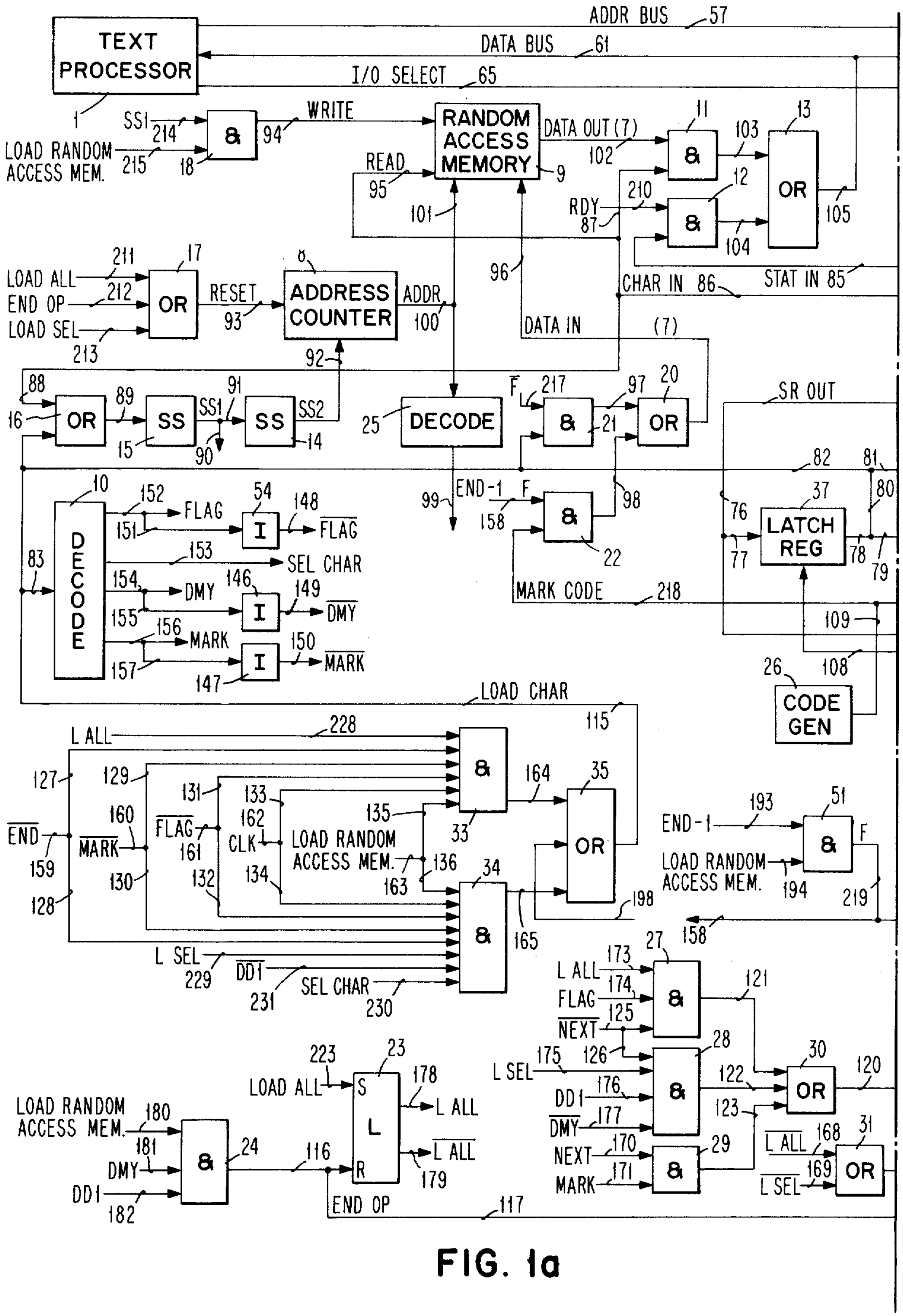
FIG. 1 (1*a* and 1*b*) is a block diagram of the system according to this invention illustrating a text processor, a random access memory, and an electronic dynamic shift register along with the interconnections and control therebetween.
Figure 1B:
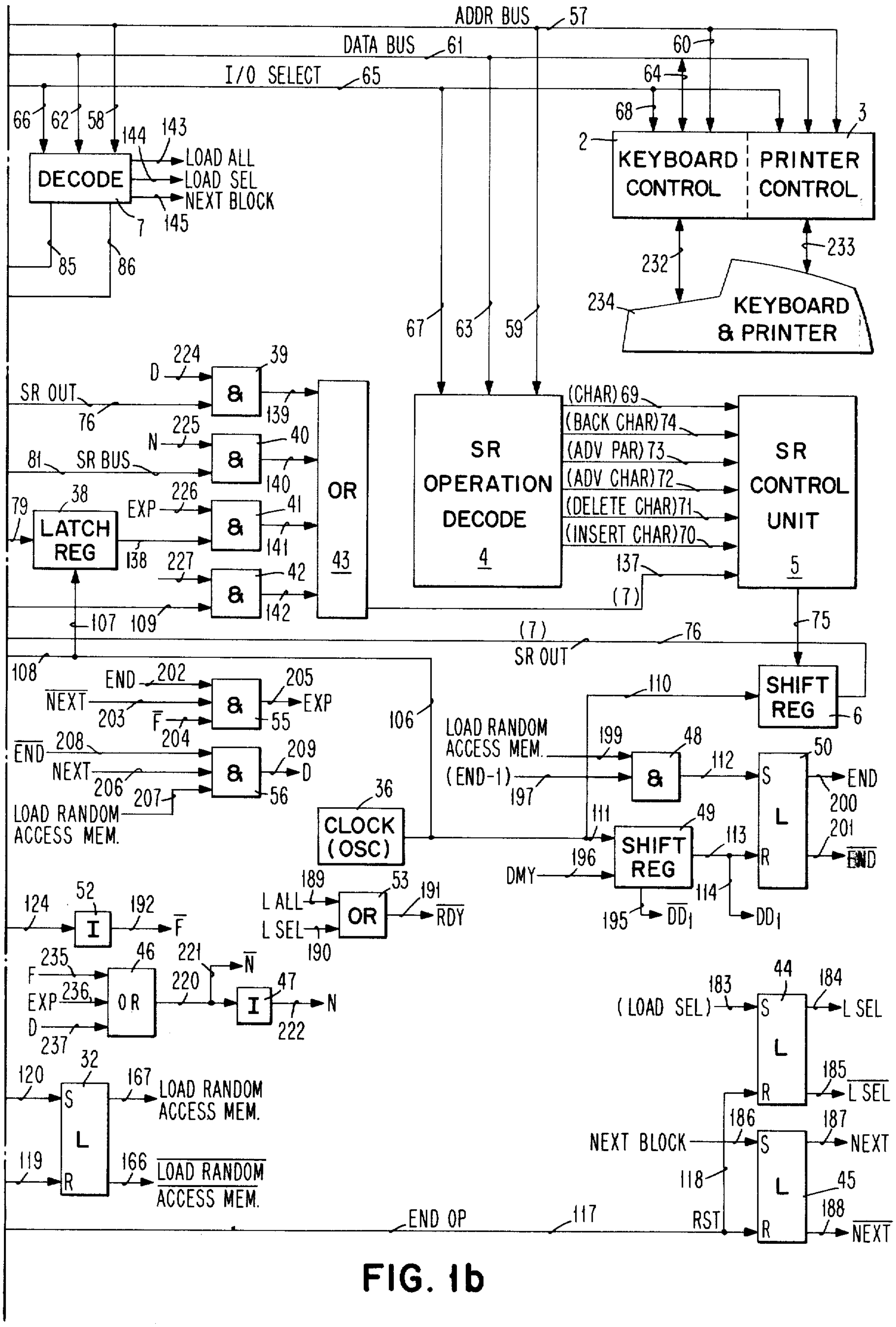

For a more detailed description of this invention of attaching a shift register to a text processor, reference is made first to FIG. 1. in FIG. 1, there is shown a basic overall block diagram of this system. The major data paths are 1) along line 61 to and from text processor 1 and printer control 3, 2) along lines 61 and 63 to and from text processor 1 and shift register operation decode 4, 3) along line 69 from shift register operation decode 4 to shift register control unit 5, 4) along line 75 from shift register control unit 5 to shift register 6, 5) along lines 76 and 77 from shift register 6 to latch register 37, 6) along lines 78 and 79 from latch register 37 to latch register 38, 7) along line 138 from latch register 38 to AND gate 41, 8) along line 141 from AND gate 41 to OR gate 43, 9) along line 137 from OR gate 43 to shift register control unit 5, 10) along lines 78, 80, and 82 from latch register 37 to AND gate 217, 11) along line 97 from AND gate 21 to OR gate 20, 12) along line 96 from OR gate 20 to random access memory 9, 13) along line 102 from random access memory 9 to AND gate 11, 14) along line 103 from AND gate 11 to OR gate 13, and 15) along line 105 from OR gate 13 to line 61. Text processor 1, keyboard control 2, and printer control 3 can be equivalent to those used with the IBM Mag Card II Typewriter. Keyboard control 2 and printer control 3 for the IBM Mag Card II Typewriter are set out on pages 138 and 139 of the IBM Office Products Division Customer Engineering Pictorial Reference/Adjustment Manual, Form No. 241-5583-3, (Revised) June 1973. Text processor 1, and decodes 4 and 7, as well as the interconnections therebetween, can be equivalent to structure described for the IBM Magnetic Tape "Selectric" Composer in the IBM Office Products Division Customer Engineering MT/SC and MT/SR Insruction Reference Parts Catalog, Form No. 241,5460, Complete Manual, October 1967. Of course, it is to be appreciated that the particular structure of text processor 1 forms no part of this invention. Any structure capable of producing outputs along lines 85, 86 and 143–145 dependent upon inputs along lines 87 and 102 will suffice. In this respect, decodes 4 and 7 can be eliminated by providing a number of input lines equivalent to the number of output lines.

Communication between keyboard control 2 and text processor 1 is along lines 57 and 60, and lines 65 and 68 from text processor 1 to keyboard control 2. Test processor 1 and keyboard control 2 are in two-way communication along lines 61 and 64. Communication between text processor 1 and printer control 3 is along lines 57 and 65 from test processor 1 to printer control 3. Text processor 1 and printer control 3 are in two-way communication along line 61. Line 57 is an address buss, line 61 is a data buss, and line 65 is an I/O select line.

Each of the following described operations are initially initiated by operator keying on keyboard and printer 234. Keyboard and printer 234 is in two-way communication with keyboard control unit 2 along line 232 and printer control 3 along line 233.

Text processor 1 is structured to receive characters from keyboard control 2, process these characters using internal storage means for temporary storage, and to output characters to printer control 3. Address bits on address buss 57 are used to distinguish between input and output instructions and between device addressing of keyboard control 2, printer control 3, and shift register 6.

The primary storage means for storing text in this system is shift register 6. Shift register 6 is an electronic dynamic shift register and this shift register along with shift register control unit 5 is fully described in U.S. Pat. No. 3,675,216. Text enters shift register 6 by being output from text processor 1 along data buss 61 concurrently with an address on address buss 57. The address appearing on address buss 57 is decoded by shift register operation decode 4. The text and address are output to shift register operation decode 4 along with a pulse applied along the I/O select line 65. For example, when a character is to be output from text processor 1 and inserted into shift register 6, the character is applied along data buss 61, a combination of bits are applied along address buss 57, and a signal or pulse is applied along I/O select line 65. These outputs are applied to the shift register operation decode 4. Upon decode, the character is gated to shift register control unit 5 along line 69 and a command or instruction is gated along line 70 for inserting the character into the shift register 6. Other commands can also be generated by text processor 1 and output along address buss 57 to shift register operation decode 4. Another example is a paragraph advance operation. For this operation, an output from shift register operation decode 4 would be applied along line 73 to shift register control unit 5. Other defined operations could be backspacing along line 74, character advance along line 72, and delete character along line 71.

The most important aspect of this invention relates to inputting data into text processor 1 from shift register 6 for justification or other purposes. This process basically involves the gating of a block of data from shift register 6 into random access memory 9 and then to text processor 1. The commands associated with this operation are "load all first", "load select first", "load all next", and "load select next". All instructions or commands can be stored in the text processor memory and retrieved under logic control. The load all first command is for loading all characters beginning with, but not including the operation flag. The load select first command is for loading only selected characters beginning at the beginning of memory and including the flag. The load all next command is for loading all characters beginning with a mark code and advancing the mark during the loading operation. The load select next command is for loading only selected characters beginning at the mark code and for advancing the mark during the loading operation.

When a scan operation is in order for scaanning a line of text or otherwise sampling the contents of the shift register 6, one of the above commands will be output from the text processor 1 to decode 7 along the address buss 57 and along buss 58. A pulse in conjunction therewith will be applied along the I/O select line 65 and along line 66 to decode 7. Decode 7 in turn will output the signals "load all", "load sel", or "load next block". A load all signal will be applied along line 143, a load sel signal will be applied along line 144, and a next block signal will be applied along line 145. One of these signals will result in text being transferred from shift register 6 into random access memory 9. The text processor will then determine if random access memory 9 has been loaded from shift register 6 by applying a command along address buss 57 and 58 to decode 7. The output of decode 7 will be a "stat in" signal along line 85 to AND gate 12. The other input to AND gate 12 will be a "ready condition" signal applied along line 210. This signal will be gated through AND gate 12, along line 104, through OR gate 13, and along line 105 to data buss 61. This is for signaling text processor 1 that an operation has been completed. When the ready condition is determined, then text processor 1 will output a series of instructions along address buss 57 in conjunction with a signal applied along I/O select line 65. These signals are then applied along lines 58 and 66, respectively, to decode 7. The output of decode 7 will be a "char in" signal along lines 86 and 87 to AND gate 11 and along line 86 and read line 95 to random access mamory 9. This signal will cause one character to be transferred out of random access memory 9 to data buss 61. The output from random access memory is along line 102, through AND gate 11, along line 103, through OR gate 13, and along line 105 to data buss 61.

The outputs load all along line 143, load sel along line 144, and next block along line 145 from decode 7 and the functions performed thereby will be discussed in more detail below.

Figure 2:
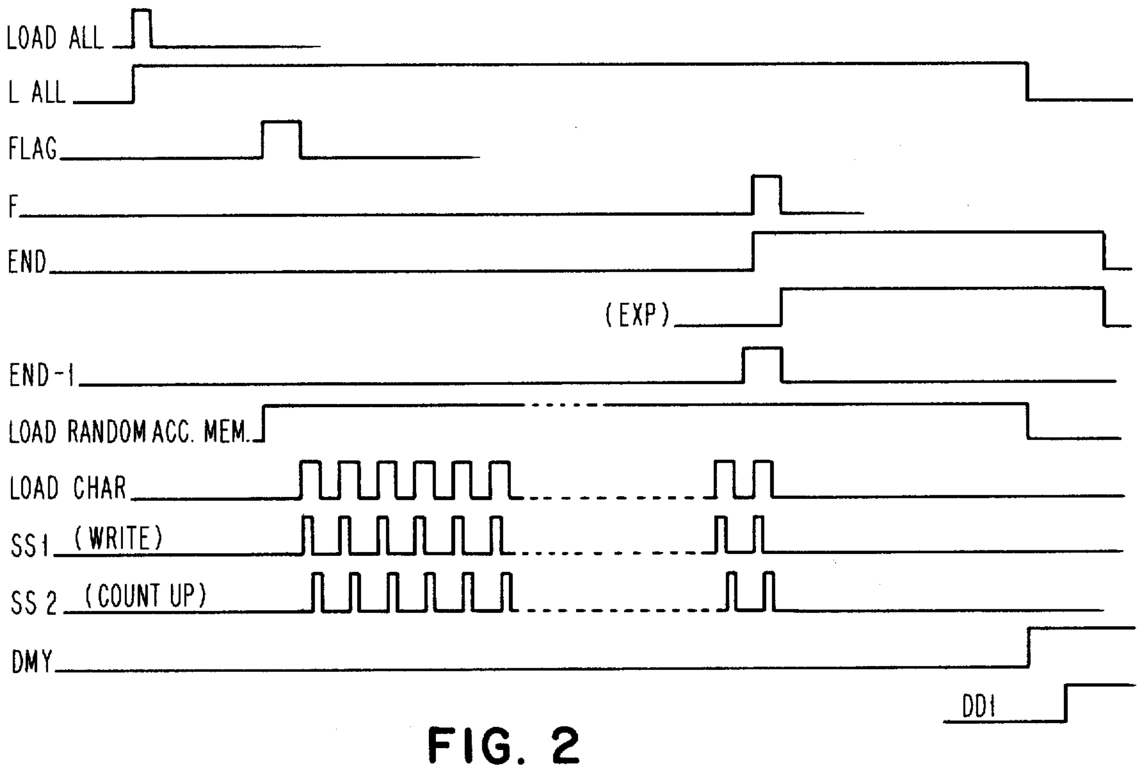
FIG. 2 is a timing diagram for system operations when the capacity, minus one, of the random access memory is reached during the loading thereof with characters before a dummy code is detected in the shift register data flow.

Referring next to FIG. 2 in conjunction with FIG. 1, the load all output along line 143 from decode 7 is applied along the set line 223 to latch 23. When latch 23 is set, an output therefrom will be applied along line 178 designated L all.

The text stored in shift register 6 normally circulates along lines 76 and 77, through latch register 37, and along lines 78, 80, and 81 to AND gate 40. When an N signal is applied along line 225 to AND gate 40, text is gated through AND gate 40 and along line 140, through OR gate 43, and along line 137 into shift register control unit 5. From shift register control unit 5, data is transferred along line 75 back into shift register 6. When a flag code appears at the output of latch register 37 and along lines 78, 80, 82, and 83, it is decoded by decode 10. The output of decode 10 will be applied along line 152. This flag output is also applied along line 174 to AND gate 27. The other inputs to AND gate 27 are an L all signal along line 173 and a NOT next signal along line 172. The output from AND gate 27 is applied along line 121 to OR gate 30. The output of OR gate 30 is along the set line 120 to latch 32. Upon the setting of latch 32 an output is applied along line 167 designated load random access memory.

As each character shifts out of shift register 6 and appears at the output of latch register 37 under the control of clock 36, a load character signal is output from OR gate 35. The input into OR gate 35 for this signal is along line 164 from AND gate 33. The inputs to AND gate 33 are L all along line 228, NOT end along lines 159 and 127, NOT mark along lines 160 and 129, NOT flag along lines 161 and 131, clock along lines 162 and 133, and load random access memory along lines 163 and 135. Each of these signals is a short duration and there is only one signal or pulse for each character aappearing at the output of latch register 37. The signal load character output fron AND gate 35 is applied along line 115, through OR gate 116, and along line 89 to single shot 15. The output of single shot 15 is an SS1 signal along line 91 to single shot 14 for causing the firing thereof. When single shot 14 fires, an SS2 signal is applied along line 92 for incrementing address counter 8. Address counter 8 applies addresses along lines 100 and 101 to random access memory 9. Address counter 8 had previously received a reset signal from OR gate 17 along line 93. This resulted from a load all signal applied along line 211. Thus the first character is located at address 0 in random access memory 9.

Each time single shot 15 fires and a load random access memory signal is applied along line 215 to AND gate 18, a write pulse or signal is applied to random access memory 9. When single shot 15 fires, an SS1 signal is applied along lines 90 and 214 to AND gate 18. The output of AND gate 18 is along line 94 to random access memory 9. The load random access memory signal applied along line 215 is output from latch 32 along line 167.

The data to be written into the random access memory 9 is applied along the data-in line 96 from OR gate 20. This data is originally output from latch register 37 along lines 78, 80, and 82 and applied to AND gate 21. The other input to AND gate 21 is a NOT F signal applied along line 217. The output from AND gate 21 is along line 97 to OR gate 20. From the above, each character following the flag is written into the random access memory 9 and address counter 8 is incremented for each of these characters.

As this operation continues, the capacity of either the shift register memory in shift register 6 or the random access memory 9 will be reached. The end of memory in shift register 6 is signified by the detection of a dummy code by decode 10. Decode 10 can be equivalent to decode 42 in U.S. Pat. No. 3,675,216. The output of decode 10 in this case will be a signal applied along line 154. When the capacity, minus one, of the random access memory has been reached, an end - 1 signal will appear at the output of decode 25 and along line 99. The input to decode 25 is along line 100 from address counter 8. Decode 25 can be equivalent to that depicted in FIG. 11–10*a* on page 495 of Digital Computer Components and Circuits by R. K. Richards, D. Van Nostrand Company, Inc., January 1959. (Library of Congress Catalogue Card No. 57-13454)

A load all operation when the end - 1 signal appears on line 99 will require the writing of a mark code into random access memory 9 and shift register 6. The mark code is a code generated by code generator 26 and applied along line 218 to AND gate 22. Code generator 26 can be made up of a rotating disc or shaft utilizing the techniques described in the above-referenced Digital Computer Components and Circuits beginning on page 459. The other input to AND gate 22 is an F signal applied along line 158. From AND gate 22 the mark code is applied along line 98, through OR gate 200, and along line 96 to random access memory 9. The mark code will then be applied along line 102, through AND gate 11, along line 103, through or gate 13, and along lines 105 and 61 to text processor 1. The mark code is also applied by code generator 26 along line 109 to AND gate 42. The other input to AND gate 42 is the end - 1 signal applied along lines 99 and 227. The mark code is gated through AND gaate 42 and along line 142 to OR gate 43. From OR gate 43, the mark code is applied along line 137 to shift register control unit 5 for insertion into the data flow in shift register 6. The input of the mark code into text processor 1 will indicate tht the capacity of random access memory 9 has been reached before that of the shift register memory in shift register 6.

The mark code inserted into shift register 6 will be used for generating the "load next block" command or instruction. Continuing to refer to FIG. 2 in conjunction with FIG. 1, the end - 1 signal comes up approximately coincident with the SS2 signal applied along line 92 from single shot 14. This is because the address counter 8 counts on the SS2 signal applied along line 92. When the end - 1 signal comes up, a signal is applied along line 193 to AND gate 51. The other input to AND gate 51 is a load random access memory signal applied along line 194. The output of AND gate 51 will be an F signal applied along line 219. The F signal applied along line 219 is applied along line 158 to AND gate 22 for gating the mark code into random access memory 9 along the data line 96. At the same time, a NOT F signal is applied along line 192 from inverter 52. The output of AND gate 51 is applied along lines 219 and 124 to inverter 52. Therefore, the mark code is written into the random access memory 9 upon the write pulse. Further, at this same time the F signal appearing on line 158 is applied to AND gate 42 along line 227 to gate the mark code into the data flow of the dynamic shift register 6. As pointed out earlier, the output of AND gate 42 is along line 142 to OR gate 43 and then along line 137 to shift register control unit 5. The F signal applied along line 158 is also applied along line 235 to OR gate 46 and then along line 220 through inverter 47. The output of inverter 47 is an N signal applied along line 222. Also the output along line 220 from OR gate 46 is applied along line 221 and this is designated a NOT N signal. The N signal applied along line 222 is applied along line 225 to AND gate 40 for altering the normal data flow. The character which would normally have circulated into the shift register control path through OR gate 43 will now shift into latch register 37.

The end - 1 signal previously discussed is also applied along line 197 and gated through AND gate 48 when a load random access memory signal is applied along line 199. The output of AND gate 48 is along the set line 112 to latch 50. When latch 50 is set, an end signal will be applied along line 200. The signals end, NOT next, and NOT F are applied along lines 202, 203, and 204, respectively, to AND gate 55. The output from AND gate 55 is a signal labeled expand along line 205. The expand signal applied along line 205 is also applied alone line 226 to AND gate 41. This is for gating the contents of latch register 38 along line 141, through OR gate 43, and along line 137 into shift register control unit 5. This in effect cretes a shift register path one character longer. That is, the data flow has been expanded. This is since the mark code has been inserted into the data flow. This path is maintained until a dummy code appears at the output of latch register 37 and is decoded by decode 10. The dummy signal appearing on line 154 from decode 10 is applied along line 196 to shift register 49 and delayed one bit time before being applied along lines 113, 195 and 114. The output along lines 113 and 114 is labeled DD1, and the output along line 195 is labeled NOT DD1. The output of shift register 49 is also applied along line 113 for resetting latch 50. Shift register 49 is controlled by clock 36 along line 111. Upon the resetting of latch 50, a NOT end signal is applied along line 201. The delay through shift register 49 provides time for the dummy character to shift along lines 78 and 79 to latch register 38. As shown in FIG. 2, when DD1 comes up, the latch 50 is reset. This causes a NOT expand signal to be applied along line 205 from AND gate 55 and an N signal to be applied along line 222. The NOT N signal is applied along lines 220 and 221 from OR gate 46. The application of the N signal along lines 222 and 225 to AND gate 40 restores the normal data path along lines 81 and 140.

At this time latch 23 is reset along line 116. Signals load random access memory along line 180, dummy along line 181, and DD1 along line 182 are applied to AND gate 24 and along line 116 for resetting latch 23. When latch 23 is reset a NOT L all signal is applied along line 179. When a signal is applied along line 116, it is also applied along reset line 117 to latch 45 and along reset line 118 to latch 44. When latch 44 is reset, a NOT L sel signal is applied along line 185. When latch 45 is reset, a NOT next signal is applied along line 188. It is to be assumed that latches 44 and 45 are not on in this case. The above-described operation has now been completed and the random access memory had been completely loaded.

A NOT ready signal is applied along line 191 from OR gate 53. The inputs into OR gate 53 are either L all along line 189 or L sel along line 190. Text processor 1 will determine the ready condition by outputting signals along address buss 57 and I/O select line 65. These signals are decoded by decode 7 and a stat in signal is applied along line 85. With the NOT ready signal applied along line 191 and 210 to AND gate 12, a signal is applied along line 104, through OR gate 13, and along line 105 to the data buss 61. This NOT ready condition is then input to the text processor.

Another situation that could have occurred in the load all operation is that the end of the dynamic shift register memory in shift register 6 could have been reached before the end-1 signal on line 99. The operations for this are substantially similar to the next described operation.

The load select operation is for handling the situation when the operation flag is repositioned relative to mode, measure and other codes and an operation such as paragraph advance has been initiated. There are no means incorporated into text processor 1 for determining when an operation such as paragraph advance is initiated. After the operation flag has been advanced relative to other codes, text processor 1 will output a load sel command to load selected characters beginning at the beginning of memory. These selected characters can be mode codes, flag measure codes, indent tabs, required carier returns, etc. It would be possible to input all characters beginning at the beginning of memory up to the operation flag, but this would consume a great deal of text processing time in terms of scanning. Therefore, only those characters which are needed by text processor 1 are input during the load select operation. These characters are determined by decode 10 which outputs a select character signal along line 153 each time a desired character appears at the output of latch register 37.

Other outputs from decode 10, not previously described, are NOT flag applied along line 148. This results from a flag input along lines 152 and 151 to inverter 54. Another output from decode 10 is applied along lines 154 and 155 to inverter 146. The output of inverter 146 is NOT dummy applied along line 149. A dummy output is applied along line 154. Yet another output from decode 10 is a mark applied along line 156 and a NOT mark applied along line 150. The mark applied along lines 156 and 157 is inverted by inverter 147.

Figure 3:
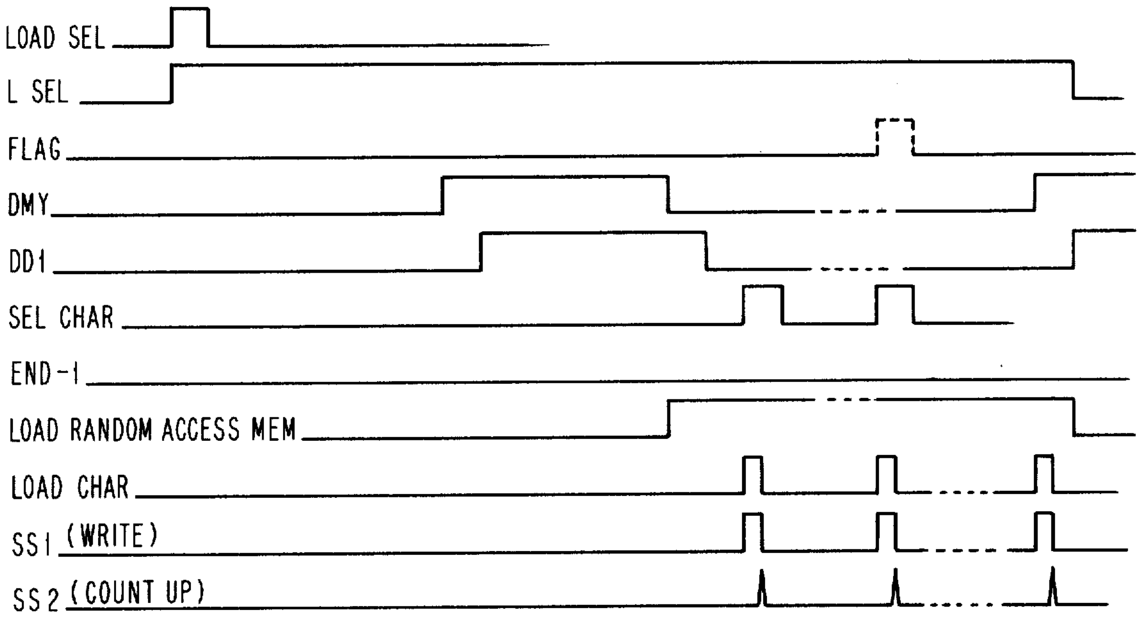
FIG. 3 is a timing diagram for system operations when a dummy code is detected in the shift register data flow before the capacity minus one, of the random access memory is reached during the loading of selected characters.

A load sel signal will be applied along line 144 from decode 7 upon command from text processor 1 along address buss 57 and I/O select line 65. The load sel signal applied along line 144 is applied to latch 44 along set line 183. When latch 44 is set, an L sel signal is applied along line 184. Referring for a moment to FIG. 3, it is seen that the load random access memory signal comes up when the DD1 and not dummy signals are up. This indicates that the first character in the shift register memory of shift register 6 has been detected. The L sel signal applied along line 184 upon the setting of latch 44 is applied along line 175 to AND gate 28. The other inputs to AND gate 28 are DD1 along line 176, NOT dummy along line 177 and NOT next along lines 125 and 126. The output from AND gate 28 is applied along 122, through OR gate 30, and along set line 120 to latch 32. When latch 32 is set a load random access memory signal is applied along line 167. Data will continue shifting out of shift register 6 and through latch register 37, being decoded by decode 10. For each character or code of interest, a select character signal is applied along line 153. At the same time a signal will be applied along line 115 from OR gate 35. The input into OR gate 35 is along line 165 from AND gate 34. The inputs into AND gate 34 are load random access memory along lines 163 and 136, clock along lines 162 and 134, NOT flag along lines 161 and 132, NOT mark along lines 160 and 130, NOT end along lines 159 and 128, L sel along line 229, select char along line 230, and NOT DD1 along line 231. The L sel signal applied along line 229 is from line 184. The select character signal along line 230 is from line 153. The NOT DD1 signal along line 231 is from line 195. Therefore, for each desired character, a load character signal is applied along line 115 to OR gate 16. This will result in the firing of single shots 14 and 15 which in turn cause the desired character to be written into random access memory 9. The SS1 signal applied along line 90 is applied along line 214 to AND gate 18 and then along write line 94. Upon the write signal or pulse applied along line 94, the desired character appearing at the output of latch register 37 is applied to AND gate 21 and written into random access memory 9 along line 96. This operation then continues for other characters. charactes. It is to be noted that one of the desired characters is the operation flag.

Termination of this operation is indicated in two ways. One is for the end of the random access memory to be reached as indicated by an end-1 signal appearing along line 99 at the output of decode 15. The timing for this condition is very similar to that discussed relative to the load all operation. The other is for the end of the shift register memory of shift register 6 to have been reached. This will be indicated by a dummy code appearing at the output of latch register 37. The timing for this situation is shown in FIG. 3. The dummy appearing at the output of decode 10 is delayed one bit time through shift register 49 having outputs DD1 and NOT DD1 as above described. When a dummy appears at the output of latch register 37, it is to be written into the random access memory 9 in order that text processor 1 can determine that the end of the shift register memory in shift register 6 has been reached. The dummy appearing at the output of latch register 37 is gated through AND gate 21 to random access memory 9 along line 96. It is important to note that the select character signal applied along line 153 comes up when either dummy codes or characters are detected. When a dummy code is detected, a signal is applied along the load character line 115; again causing single shots 14 and 15 to fire for writing the dummy code into random access memory 9. Upon the writing of the dummy code into random access memory 9, address counter 8 is incremented one count. After one bit time, the DD1 signal comes up and appears at the input of AND gate 24 along line 182. The signal is then applied from AND gate 24 along lines 116, 117, and 118 for resetting latch 44 (which is on). Latch 23 is also reset along line 116. Also, latch 32 is reset due to the signal applied along line 119. A signal applied along line 119 originates from a NOT L all signal applied along line 168 or a NOT L sel signal applied along line 169 to OR gate 31. When latch 32 is reset, a NOT load random access memory output will be applied along line 166. This terminates this operation.

It is to be appreciated that operations such as advancing the flag or mark could readily be performed through a delete and reinsert operation.

Figure 5A:
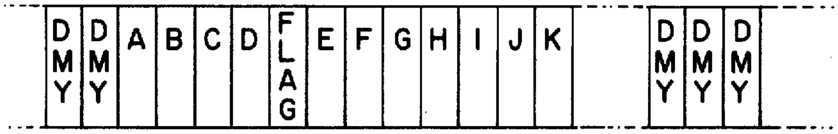
FIG. 5 (5A and 5B) illustrates shift register memory organizations before and after system operations illustrated in the timing diagrams of FIGS. 2 and 3.

Referring next to FIG. 5A there is illustrated a data flow contained in the shift register memory of shift register 6. It will be assumed that this is the organization of the memory prior to the load all and load select operations described above. Further, it is assumed that the operation flag is illustrated is addressing the character E.

Figure 5B:
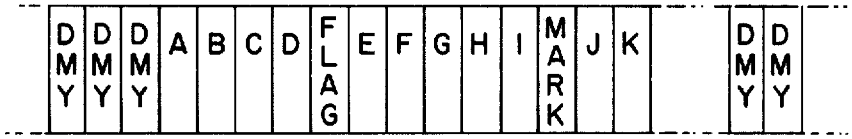

Now refering to FIG. 5B there is shown the memory organaization after the above-described load all and load select commands have been generated by text processor 1. A mark code has been inserted in the memory following the I. In the case of a load all operation, the mark code would always follow the operation flag. In the case of a load select operation, it can be positioned before or after the operation flag depending upon the number of selected characters. Following either of these operations and the loading of the random access memory with characters from shift register 6, it is necessary for text processor 1 to sample random access memory 9 one character at a time in order to perform such functions as calculating a justification solution. The calculation of a justification solution would be accomplished by outputting a signal or command along address buss 57 in conjunction with a signal along I/O select line 65. These signals would be decoded by decode 7 and a signal applied along line 86. When a char in signal is applied along line 86, data appearing at the output of random access memory 9 is gated through AND gate 11 and OR gate 13 to data buss 61 for inputting into text processor 1. The signal applied along line 86 is also applied along line 95 to random access memory 9. The signal appearing on line 95 is a read signal. Each time a load character signal appears on line 84, address counter 8 is incremented. Address counter 8 was previously reset to the initial address by the end op signal applied along line 212, through OR gate 17, and along line 93. The other inputs to OR gate 17 are load all along line 211 and load sel along line 213. Address counter 8 is reset at the end of each load operation. Therefore, the first character read out of random access memory 9 is at position 0. Characters are transferred to text processor 1, one at a time upon command by text processor 1. Text processor 1 is structured to detect either a dummy or mark code and output an appropriate instruction. The usual mode of operation is for text processor 1 to output a load instruction and then output a series of input instructions until a line of text has been accumulated. After a line of text has been acumulated, text processor 1 processes the line in terms of calculating a justification solution and then outputs the characters making up the line, one at a time, to printer control 3. For each character output, an advance character command is output from text processor 1 to shift register operation decode 4. This results in the advancing of the operation flag in conjunction with the printing of characters by keyboard and printer 234. At the beginning of the next line, another load operation command is output.

Situations may arise where, during either a load all or load sel operation, a sufficient number of characters cannot be loaded into random access memory 9 to provide a line of information for which a justification solution can be calculated. When this occurs, a mark code in memory will be detected by text processor 1 as it is output from random access memory 9. When detected, text processor 1 will issue a load next command. This may be a load all next command or a load select next command. The function of the load next command is to load characters beginning with the mark code rather than the flag or a dummy code.

Figure 4C:
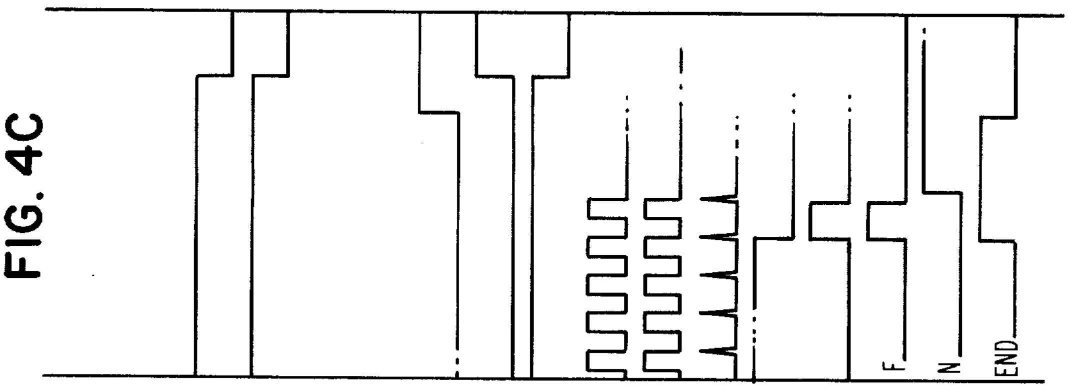
FIG. 4 (4A, 4B, and 4C) is a timing diagram for system operations for a second loading of data following that illustrated in FIGS. 2 and 3.
Figure 4B:
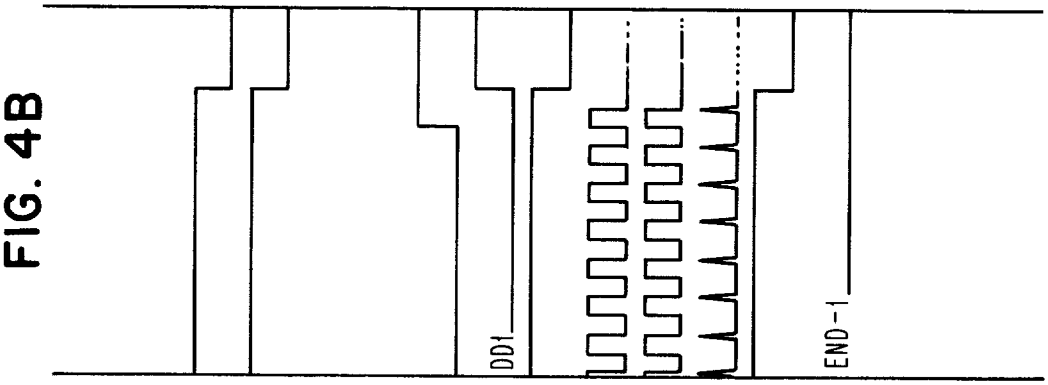
Figure 4A:
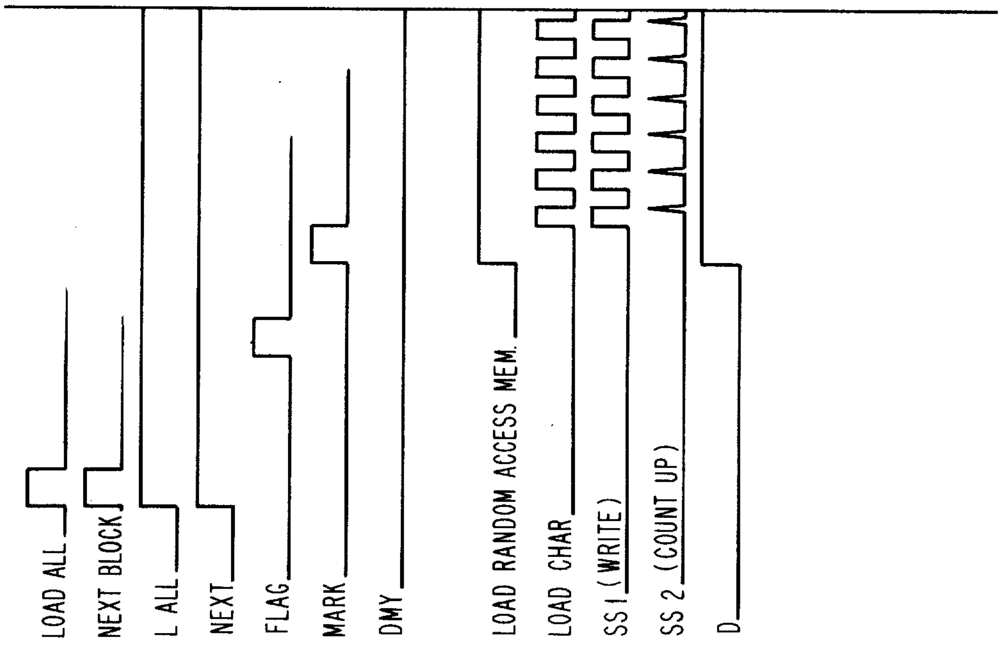

Considering the load all next operation, reference is next made to FIG 4A in conjunction with FIG. 1. FIG.

4A illustrates the timing for the beginning of the operation. A command is output from text processor 1 along address buss 57 in conjunction with a signal along I/O select line 65. These signals are decoded by decode 7 and a next block signal is output along line 145. At this time there will be a signal on load all line 143. The load all signal on line 143 is applied along set line 233 to latch 23. When latch 23 is set, an L all signal is applied along line 178. The next block signal applied along line 145 is also applied along set line 186 to latch 45. When latch 45 is set a next signal will be applied along line 187. No further action occurs until a mark code appears at the output of latch register 37 and is decoded by decode 10. A mark signal is then applied along line 156. The next signal applied along line 187 is also applied along line 170 to AND gate 29. The other input to AND gate 29 is the mark signal applied along line 156 to line 171. The output of AND gate 29 will be along line 123, through OR gate 30, and along set line 120 to latch 32. When latch 32 is set a load random access memory signal is applied along line 167.

Characters following the mark code in the shift register memory of shift register 6 are written into random access memory 9 along the load character line 115. It is to be noted that the mark code is not written into the random access memory 9. This is because of the logical level of the mark signal applied along line 160 to AND gate 33.

The mark code stored in shift register 6 is to be advanced and therefore, a different shift register control path is required. Signal D appearing at the output of AND gate 56 comes up when the next, load random access memory and NOT end signals are applied along lines 206, 207, and 208, respectively to AND gate 56. Signal D is then applied to AND gate 39 along line 224. The data path is now along line 139 to OR gate 43. The output of shift register 6 will now bypass latch 37 and shift directly back through AND gate 39. This in effect shortens the shift register data flow by one character and deletes the mark code from the data flow. That is, when the mark code shifts into latch register 37, the data paths are altered, and for any subsequent operations the mark code will written over. Once the data paths are altered, there is no output for the mark code.

The operation then continues with characters being written into the random access memory 9 as they appear at the output of latch register 37. As described above, there are two ways in which termination of this operation are indicated. One is when the end of the shift register memory in shift register 6 is reached and the other is when the end of random access memory 9 has been reached.

Referring to FIG. 4B in conjunction with FIG. 1, there is illustrated the timing when the end of the shift register memory in shift register 6 is reached. In this case, the dummy code shifts into latch register 37. When the dummy code appears at the output of latch register 37 it is gated through AND gate 21 and into random access memory 9 upon the write signal applied along line 94 from AND gate 18. When the signal DD1 comes up one bit time later, the end op signal is applied along line 117. This occurs when the load random acess memory signal, and the dummy signal are up and applied to AND gate 24. Latch 23, latch 32, and latch 45 are then reset. This terminates this operation.

The signal N along line 222 will now come up after the signal D along lines 209 and 237 goes down. This is illustrated in the timing diagram of FIG. 4C. The signal N is output along line 222 from inverter 47. This signal will come up as pointed out earlier after the D signal goes down. The N signal will then be applied to AND gate 40 to restore the normal data path. The mark code will now be written into shift register 6.

When the end of random access memory 9 is reached, a mark code is to be written into both shift register 6 and random access memory 9. Reference is now made to FIG. 4C in conjunction with FIG. 1. When one character position remains in random access memory 9, an end - 1 signal is applied along line 99 from decode 25. This signal is applied to AND gate 51 along line 193. An F signal is applied along line 158 to AND gate 22. The signal appearing on line 158 is applied to AND gate 22 to gate the mark code generated by code generator 26 through OR gate 20 and into random access memory 9. The signal F is at the same time applied to AND gate 21 for inhibiting the character appearing at the output of latch 37 from gating through AND gate 21. The F signal is also applied along line 227 to AND gate 42 to gate the mark code from code generator 26 into the data flow. At this time, latch 50 is set due to the coincidence of end - 1 and load random access memory signals applied along lines 197 and 199, respectively, to AND gate 48. The output of AND gate 48 is applied along set line 112 to latch 50. When latch 50 is set, as described above, an end output will be applied along line 200. When this occurs the D signal applied along line 209 will be down. At the end of the end - 1 signal, the F signal does down and the N signal comes up for restoring the normal data path. The mark code is inserted at this point. Due to the logical level of the end signal applied to AND gates 33 and 34, the load character signal applied along line 115 will be down. This is since random access memory 9 is now full.

The F signal is applied along line 198 to OR gate 35 at the bit time that the mark code is inserted in the memory. This will cause a load character signal to be applied along line 115. The logical level of the end signal applied along line 159 is at the time inhibiting other inputs along line 115. This is also appliable to the termination of the end - 1 condition described above. For this cause the signals end, next, and L all are up. These conditions continue until the end of memory is reached and a dummy code is decoded in latch register 37. This decode is then applied to shift register 49 along line 196. A DD1 output along lines 113 and 114 from shift register 49 will occur one bit time later. The DD1 signal is applied along line 182 to AND gate 24. A load random access memory signal is applied along line 180 and a dummy signal is applied along line 181. The signal then applied along line 116 results in the resetting of latches 23, 32, 44 and 45; terminating the operation.

The operation load select next block is not described in detail here since the logical operation is almost identical to that previously described. The operation begins when latch 32 is set by a mark code applied along line 171 to AND gate 29 in conjunction with a next signal applied along line 170. The output of AND gate 29 is applied to OR gate 32 along line 123 and then along line 120 to latch 32. The setting of latch 32 as previously described is indicated by a signal applied along line 167. The load select next operation is terminated either on an end of shift register memory or an end - 1 condition. The only real difference between this operation and the load all next operation is that the selected characters which are decoded at decode 10 cause a load character signal along line 115 for writing into random access memory 9.

Figure 6A:
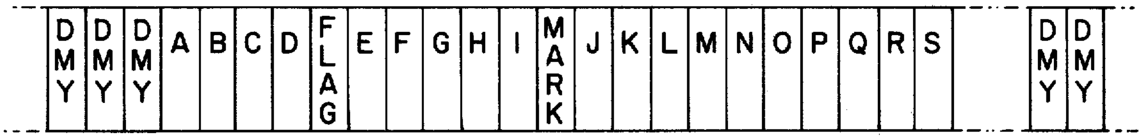
FIG. 6 (6A and 6B) illustrates shift register memory organizations before and after system operations illustrated in the timing diagrams of FIG. 4.
Figure 6B:
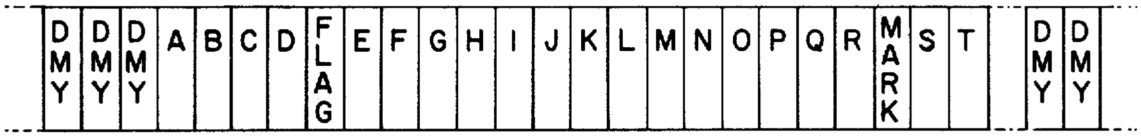

Referring next to FIG. 6A there is illustrated the data flow and memory organization before a load next operation. It can be seen that the mark code is at the same position in memory as illustrated in FIG. 5B. In FIG. 6B is illustrated the memory after the load next operation. It is seen that the mark code has been moved or repositioned in memory. For either operation there will be no mark code if the end of memory or dummy characters are detected prior to reaching the end of random access memory 9.

Figure 7:
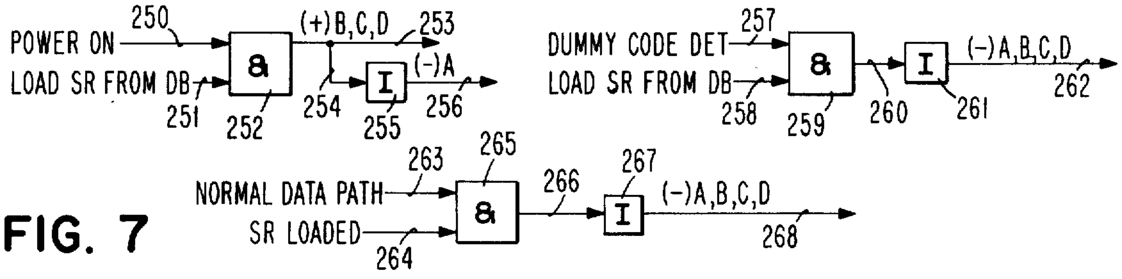
FIG. 7 illustrates the structure incorporated in the shift register control of FIG. 1 for initially loading the shift register with dummy codes.

Referring next to FIG. 7 there is illustrated the structure incorporated in shift register control unit 5 for initially loading shift register 6 with dummy codes on power-on. When a power-on signal is applied along line 250 to AND gate 252 and a load shift register from data buss signal is applied along line 251, an output from AND gate 252 will be applied along line 253 for applying positive logical levels to lines B, C and D of the shift register control illustrated in U.S. Pat. No. 3,675,216. The output of AND gate 252 is also applied along line 254 and through inverter 255 for applying a negative logical level along line 256. The negative logical level along line 256 is applied to the A line. During decode by decode 42 in the above mentioned patent, when a dummy code is detected, a signal is applied along line 257 to AND gate 259. The other input to AND gate 259 is along line 258 which is the same signal applied along line 251 for loading the shift register from the data buss. The output of AND gate 259 is along line 260 to inverter 261. The output of inverter 261 is a negative logical level along line 262 which is applied to the A, B, C, and D lines. The normal data path is restored and a signal representative thereof is applied along line 263. The other input to AND gate 265 is along line 264 indicating that the shift register has been loaded with dummy codes. The output of AND gate 265 is along line 266 to invertor 267. The output of inverter 267 is a negative logical level applied along line 268 to the A, B, C and D lines.

Figure 8:
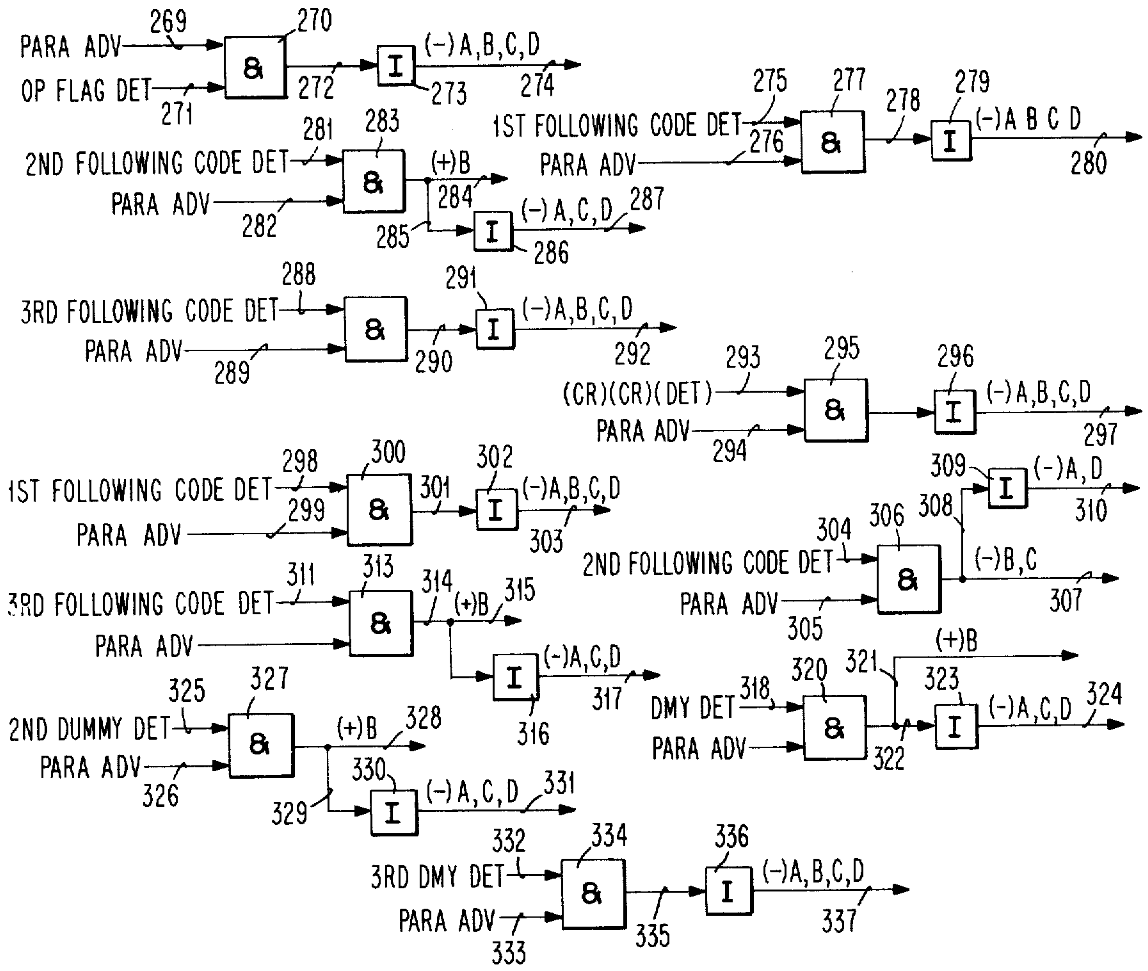
FIG. 8 illustrates the structure incorporated into the shift register control of FIG. 1 for performing a paragraph advance operation.

Referring next to FIG. 8 there is illustrated the structure incorporated in to shift register control unit 5 for performing a paragraph advance operation. The paragraph advance signal is applied along line 269, and when the operation flag is detected by decode 42, a signal is applied along line 271. These signals are applied to AND gate 270 and a signal is output from AND gate 270 along line 272 to inverter 273. The output of inverter 273 is along line 274 for applying negative logical levels to lines A, B, C and D. When the first code following the operation flag is detected, a signal is applied along line 275. This, in conjunction with a paragraph advance signal applied along line 276, is applied to AND gate 277. The output of AND gate 277 is along line 278 to inverter 279. The output of inverter 279 is along line 280 for applying negative logical levels to lines A, B, C and D. When the next following code is detected and a signal representative thereof is applied along line 281 in conjunction with a paragraph advance signal applied along line 282, an output if applied along line 284 from AND gate 283. The output along line 284 is applied to the B line and is a positive logical level. The output of AND gate 283 is also applied along line 285 to inverter 286. The output of inverter 286 is along line 287 for applying negative logical levels to lines A, C and D. When the third following code is detected by decode 42, a signal is applied along line 288. This is applied to an AND gate in conjunction with a paragraph advance signal applied along line 289. The output of the AND gate is along line 290 to inverter 291. The output of inverter 291 is along line 292 for applying negative logical levels to lines A, B, C and D. When a double carrier return is detected indicating the end of a paragraph, a signal is applied along line 293. This signal in conjunction with a paragraph advance signal along line 294 is applied to AND gate 295. The output of AND gate 295 is applied to invertor 296. The output of inverter 296 is applied along line 297 for applying negative logical levels to lines A, B, C and D. When the first code following the double carrier return is detected, a signal is applied along line 298. This, in conjunction with a paragraph advance signal applied along line 299, is applied to AND gate 300 for gating a signal along line 301. This signal is inverted by inverter 302 and a negative signal is applied along line 303 for applying negative logical levels to lines A, B, C and D. When the second following code is detected and a signal representative thereof applied along line 304 to AND gate 306. The paragraph advance signal is applied along line 305. The positive output from AND gate 306 is applied along line 307 to lines B and C. The output of AND gate 306 is also applied along line 308 to inverter 309. The output of inverter 309 is applied along line 310 for applying negative logical levels to the A and D lines. When the third following code is detected and a signal representative thereof is applied along line 311 to AND gate 313, a signal is gated along line 314. The signal applied along line 314 is applied to inverter 316. The output of inverter 316 is applied along line 317 for applying negative logical levels to the A, C, and D lines. The output of AND gate 313 is also applied along line 315 for applying a positive logical level to the B line. When a dummy is detected and a signal representative thereof is applied along line 318 to AND gate 320, an output is applied along line 321 for applying a positive logical level to the B line. The output of AND gate 320 is also applied along line 322 to inverter 323. The inverted signal applied along line 324 is applied to the A, C and D lines for applying negative logical levels thereto. When the second dummy is detected by decode 42, a signal is applied along line 325. Since a paragraph advance signal is applied along line 326, a signal is applied from AND gate 327 along line 328. The signal along line 328 is for applying a positive logical level to the B line. The output of AND gate 327 is also applied along line 329 to inverter 330. The output of inverter 330 is applied along line 331 for applying negative logical levels to the A, C and D lines. When the third dummy is detected by decode 42, a negative logical level is applied along line 332 to AND gate 334. The other input to AND gate 334 is a paragraph advance along line 333. The output of AND gate 334 is along line 335 to inverter 336. The output of inverter 336 is along line 337 for applying negative logical levels to the A, B, C and D lines.

Figure 9:
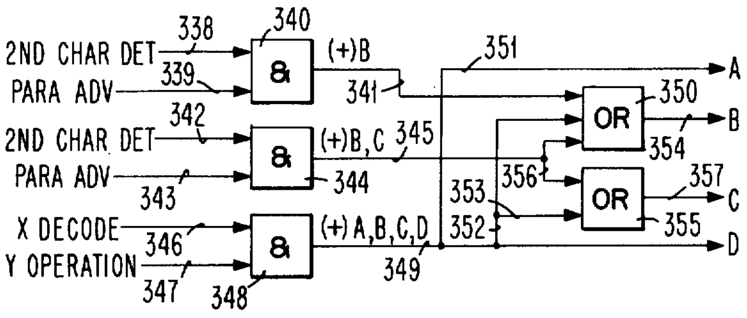
FIG. 9 illustrates the structure for controlling the shift register control of FIG. 1 for a paragraph advance operation.

Referring next to FIG. 9 there are represented in interconnections for applying logical signals to the A, B, C, and D lines. For example, if a second character detected signal is applied along line 338 in conjunction with a paragraph advance signal along line 339 to AND gate 340, a positive logical B signal is applied along line 341 to OR gate 350. The output of OR gate 350 will be along the B line 354. A second character detected signal applied along line 342 in conjunction with a paragraph advance signal along line 343 to AND gate 344 will result in positive logical B and C signals being applied along line 345. The positive logical B signal is applied to OR gate 350 and then along the B line 354. The positive logical C signal is applied along line 356, through OR gate 355, and along the C line 357. Assuming an X decode along line 346 and a Y operation along line 347 to AND gate 348, then A, B, C and D positive logical signals are to be added along line 349. The positive logical A signal on line 349 is applied along the A line 351. The positive logical B signal on line 349 is applied along line 352 to OR gate 350. The output from OR gate 350 is along the B line 354. The positive logical C signal on line 349 is applied along line 352 to OR gate 355. The output from OR gate 355 is along the C line 357. The positive logical D signal on line 349 is applied to the D line.

In summary, a text processing system is provided having a text processor, a random access memory, and an electronic dynamic shift register interconnected such that efficiency of text processing is improved. With the rapidly recirculating shift register memory used in this system, the operating point or operation flag is often rapidly moved or repositioned in memory. When so repositioned, the new operating point may be located in a section of text where a different system state is in effect. It will then be necessary to determine the mode, measure, etc. in effect for the text in question. Since the text processor does not have direct control of the operation flag, the random access memory is interfaced between the shift register and the text processor. When ready, the text processor will cause the loading of selected characters and codes into the random access memory from the shift register for processing at the text processor rate. Only necessary data is shifted out of the shift register and transferred to the random access memory for later processing by the processor. That is, depending on the operation to be performed, selected character and control codes are transferred to the random access memory. When the shift register to random access memory transfer operation is complete, the character codes stored in the random access memory are gated out to the text processor for processing. This provides for an efficient use of the processor and at the same time eliminates the necessity for any attempt to match the processor data rate to the shift register data rate.

While the invention has been particularly shown and described with reference to a particular embodiment, it will be understood by those skilled in the art that various changes in form and detail may be made without departing from the spirit and scope of the invention.

What is claimed is:

1. A system for transferring data to a low data rate processor for preparing text for printing, said system comprising:

a. first memory means being a high data rate recirculting memory for storing data comprised of text character codes and control codes;

b. decode means connected to said first memory means for decoding said control codes;

c. second memory means for storing text character codes and control codes transferred from said first memory means; and d. transfer control means controlled by instructions output by said processor and upon decode of said control codes by said decode means for causing 1) selected ones of said text character codes and control codes defined by said instructions to be transferred from said first memory means to, and stored in, said second memory means, and 2) a one at a time transfer of said selected text character codes and control codes from said second memory means to said processor when said processor indicates that it is ready.

2. A system according to claim 1 including means for determining when the capacity of said second memory means, minus one, is reached.

3. A system according to claim 2 including means for marking a location in said first memory means for defining the last code transferred from said first memory means to said second memory means when the capacity of said second memory means, minus one, is reached during a transfer of text character codes and control codes from said first memory means to said second memory means.

4. A system according to claim 3 including means for marking the last storage location in said second memory means.

5. A system according to claim 4 including means for terminating said transfer of said selected text character codes and control codes from said first memory means to said second memory means when the capacity of said second memory means, minus one, is reached.

6. A method of transferring data comprised of text character codes and control codes to a low data rate processor for preparing text for printing, said method comprising:

a. decoding, by decode means connected to a high data rate recirculating first memory means, control codes stored along with text character codes in said first memory means;

b. outputting operation instructions from said processor;

c. transferring by transfer control means selected ones of said text character codes and control codes determined by said instructions to, and storing said selected text character codes and control codes in, a second memory means upon decode of said control codes; and d. transferring by said transfer control means said selected ones of said text character codes and control codes, one at a time, from said second memory means to said processor when said processor indicates that it is ready.

7. A method according to claim 6 including marking a location in said first memory means when the end of said text character codes and control codes in said first memory means used for preparing text for printing has not been reached and the capacity of said second memory means, minus one, has been reached during a transfer of said selected ones of said text character codes and control codes from said first memory means to said second memory means.

8. A method according to claim 7 including marking the last storage location in said second memory means following an indication that the capacity of said second memory means, minus one, has been reached.

9. A method according to claim 8 including transferring said selected ones of said text character codes and control codes, one at a time, from said second memory means to said processor upon instruction from said processor and following said marking of said second memory means.

10. A method according to claim 8 including transferring said selected ones of said text character codes and control codes, one at a time, from said second memory means to said processor upon instruction from said processor and following in indication that the end of said text character codes and control codes used for preparing text for printing in said first memory means has been reached.

11. A method according to claim 8 including transferring additional text character codes and control codes from said first memory means to said second memory means upon instruction from said processor and following a transfer of text character codes and control codes from said second memory to said processor.

12. A method according to claim 8 including repetitively transferring text character codes and control codes from said first memory means to said second memory means until the end of said text character codes and control codes used for preparing text for printing has been reached in said first memory means.

* * * * *